(12) United States Patent
Ardoint et al.

(10) Patent No.: US 9,207,923 B2
(45) Date of Patent: Dec. 8, 2015

(54) COMPILER OPTIMIZATION FOR MEMOIZATION OF PURE FUNCTION ARGUMENTS

(71) Applicant: International Business Machines Corporation, Armonk, NY (US)

(72) Inventors: Jean-Louis Ardoint, Paris (FR); Benoit H. Poupon, Montreuil (FR)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 13/920,152

(22) Filed: Jun. 18, 2013

(65) Prior Publication Data

US 2014/0372996 A1 Dec. 18, 2014

(51) Int. Cl.
G06F 9/44 (2006.01)
G06F 9/45 (2006.01)
G06F 11/30 (2006.01)

(52) U.S. Cl.
CPC .............. *G06F 8/4441* (2013.01); *G06F 8/443* (2013.01); *G06F 11/30* (2013.01)

(58) Field of Classification Search
CPC ..... G06F 11/30; G06F 8/443; G06F 2217/84; G06F 11/3612; G06F 8/41
See application file for complete search history.

(56) References Cited

U.S. PATENT DOCUMENTS

| | | | |
|---|---|---|---|
| 6,427,234 B1 | 7/2002 | Chambers et al. | |
| 6,745,384 B1 * | 6/2004 | Biggerstaff | 717/156 |
| 7,353,501 B2 * | 4/2008 | Tang et al. | 717/130 |
| 2004/0098707 A1 * | 5/2004 | Tang et al. | 717/130 |
| 2007/0174819 A1 * | 7/2007 | Li et al. | 717/136 |
| 2007/0204261 A1 * | 8/2007 | Fetzer et al. | 717/163 |
| 2010/0262839 A1 | 10/2010 | Eker et al. | |
| 2010/0287541 A1 * | 11/2010 | Saunders et al. | 717/139 |
| 2010/0306751 A1 | 12/2010 | Schneider | |
| 2011/0067009 A1 * | 3/2011 | Hosokawa et al. | 717/132 |
| 2012/0054718 A1 * | 3/2012 | Auerbach et al. | 717/116 |
| 2013/0073837 A1 * | 3/2013 | Li et al. | 712/222 |
| 2013/0074057 A1 * | 3/2013 | Gounares et al. | 717/152 |

OTHER PUBLICATIONS

Mitchell A. Potter et al.; A Cooperative Coevolutionary Approach to Function Optimization; 2005 Springer; pp. 249-257; <http://link.springer.com/chapter/10.1007/3-540-58484-6_269>.*

(Continued)

*Primary Examiner* — Thuy Dao
*Assistant Examiner* — Cuong V Luu
(74) *Attorney, Agent, or Firm* — Isaac J. Gooshaw

(57) ABSTRACT

Exemplary embodiments of the present invention disclose a method and system for replacing an unevaluated input that is constant at runtime to a group of instructions that calculates an output and can not modify the unevaluated input with invocation code that calls evaluation code. In a step, an exemplary embodiment identifies a group of instructions with an unevaluated input that is constant at runtime that calculates an output and can not modify the unevaluated input. In another step, an exemplary embodiment identifies an unevaluated input to the group of instructions that is constant at runtime. In another step, an exemplary embodiment generates an evaluation code that evaluates the unevaluated input. In another step, an exemplary embodiment replaces the unevaluated input with an invocation code that invokes the evaluation code.

12 Claims, 4 Drawing Sheets

(56) References Cited

OTHER PUBLICATIONS

John J. Grefenstette; Optimization of Control Parameters for Genetic Algorithms; 1986 IEEE; pp. 122-128; <http://ieeexplore.ieee.org/stamp/stamp.jsp?tp=&arnumber=4075583>.*

Robert Malouf; A comparison of algorithms for maximum entropy parameter estimation; 2002 ACM; 7 pages; <http://dl.acm.org/citation.cfm?id=1118871>.*

Wan Jun; An Improved Method of Parameter Estimation for the Application Having High Reliability; 1992 IEEE; pp. 390-393; <http://ieeexplore.ieee.org/stamp/stamp.jsp?tp=&arnumber=204237>.*

Zhixiong Liu et al.; Empirical Study of the Random Number Parameter Setting for Particle Swarm Optimization Algorithm; 2010 IEEE; pp. 216-252; <http://ieeexplore.ieee.org/stamp/stamp.jsp?tp=&arnumber=5645320>.*

Raluca Lefticaru et al.; Functional Search-based Testing from State Machines; 2008 IEEE; pp. 525-528; <http://ieeexplore.ieee.org/stamp/stamp.jsp?tp=&arnumber=4539585>.*

G Agosta et al.; "Dynamic Memoization of Energy Efficiency in Financial Applications"; IEEE; Copyright 2011.

M. Rajasekharababu et al.; "Evolution of Degree of Purity in Programming Languages"; ScienceDirect—Procedia Technology; Printed Feb. 1, 2013; <http://www.sciencedirect.com/science/article/pii/S2212017312005877>.

B. Grant et al.; "The Benefits and Costs of DyC's Run-Time Optimizations"; ACM Transactions of Programming Languages and Systems; vol. 22; No. 5; pp. 932-972; Sep. 2000.

E. Osterlund et al.; "Analysis of Pure Methods using Garbage Collection"; MSPC '12; Jun. 16, 2012; Beijing, China; pp. 48-57; Copyright 2012.

Andrew Walbran; Optimising Java programs with pure functions: Milestone 1 report; Victoria University of Wellington School of Mathematics, Statistics and Computer Science.

H. Xu et al.; Dynamic Purity Analysis for Java Programs; PASTE '07; Jun. 13-14, 2007; San Diego, CA; Copyright 2007.

\* cited by examiner

```
package test;
import java.util.Date;

public class TestPureFunction {
    public static boolean test(Date var) {
        if (var.equals(new Date(1020L))) {         — 203, 207, 206
            return false;
        }
        if (new Date(1000L).compareTo(var) < 0) {  — 204
            return false;
        }
        return false;
    }
}
```
202 — PURE FUNCTION 213

```
package test;
import java.util.Date;
public class TestPureFunction {
    static Date $getPureFunction$0() {
        return
          TestPureFunctionPureFunctionHolder0.$pureFunction$0;
    } static Date $getPureFunction$1() {
        return
          TestPureFunctionPureFunctionHolder1.$pureFunction$1;
    }
```
211, 212 — ARGUMENT EVALUATION CODE 214

```
    public static boolean test(Date var) {
        // equals is a pure function
        if (var.equals($getPureFunction$0())) {    — 210, 209
            return false;
        }
        if ($getPureFunction$1().compareTo(var) < 0) {
            return false;
        }
        return false;
    }
}
```
208 — TRANSFORMED PURE FUNCTION 215

FIG. 2

```
package test;
import java.util.Date;
class TestPureFunctionPureFunctionHolder0 {
    static final Date $pureFunction$0 = new Date(1020L);
}
package test;
import java.util.Date;
class TestPureFunctionPureFunctionHolder1 {
    static final Date $pureFunction$1 = new Date(1000L);
}
```

- 301: outer brace around first class
- 302: `$pureFunction$0 = new Date(1020L)`
- 303: ARGUMENT CACHE CODE

FIG. 3

COMPILER OPTIMIZATION FOR MEMOIZATION OF PURE FUNCTION ARGUMENTS

FIELD OF THE INVENTION

The present invention relates generally to compiler optimizations and more specifically to enhancing program performance through the memoization of arguments of pure functions.

BACKGROUND

Many computer performance enhancement techniques are based on eliminating redundant computation. Memoization is a technique that may enhance computer program performance by decreasing computation by remembering the results of a previously executed function. A function is a group of program instructions that performs a specific task, by accepting input values, called arguments, and producing a result. A pure function is a function that always produces the same result given the same input arguments, regardless of program state, and produces no side effects, e.g., by changing the value of a variable that is visible outside the function, by altering one of its input arguments, or by performing input/output. A common memoization method records the arguments and results of an execution of a pure function and records the results. Pure functions are identified, and if a pure function is called, the arguments that are input and the results produced by the pure function are recorded if the results have not been recorded. On subsequent invocations of the same pure function, a lookup is performed, and if the arguments used in the current invocation have been used before, the recorded result associated with those arguments is used instead of executing the pure function. This approach has been found to be effective, especially in Java® programs. Java and all Java-based trademarks and logos are trademarks or registered trademarks of Oracle and/or its affiliates.

SUMMARY

Exemplary embodiments of the present invention disclose a method and system for replacing an unevaluated input that is constant at runtime to a group of instructions that calculates an output and cannot modify the unevaluated input with invocation code that calls evaluation code. In a step, an exemplary embodiment identifies a group of instructions with an unevaluated input that is constant at runtime that calculates an output and cannot modify the unevaluated input. In another step, an exemplary embodiment identifies an unevaluated input to the group of instructions that is constant at runtime. In another step, an exemplary embodiment generates an evaluation code that evaluates the unevaluated input. In another step, an exemplary embodiment replaces the unevaluated input with an invocation code that invokes the evaluation code.

BRIEF DESCRIPTION OF THE SEVERAL VIEWS OF THE DRAWINGS

FIG. 2 depicts an example transformation of a pure function with an argument that is constant at runtime, in accordance with an embodiment of the present invention.

FIG. 3 depicts an example of code that implements an argument cache for a pure function depicted in FIG. 2, in accordance with an embodiment of the present invention.

DETAILED DESCRIPTION

Figure 1:
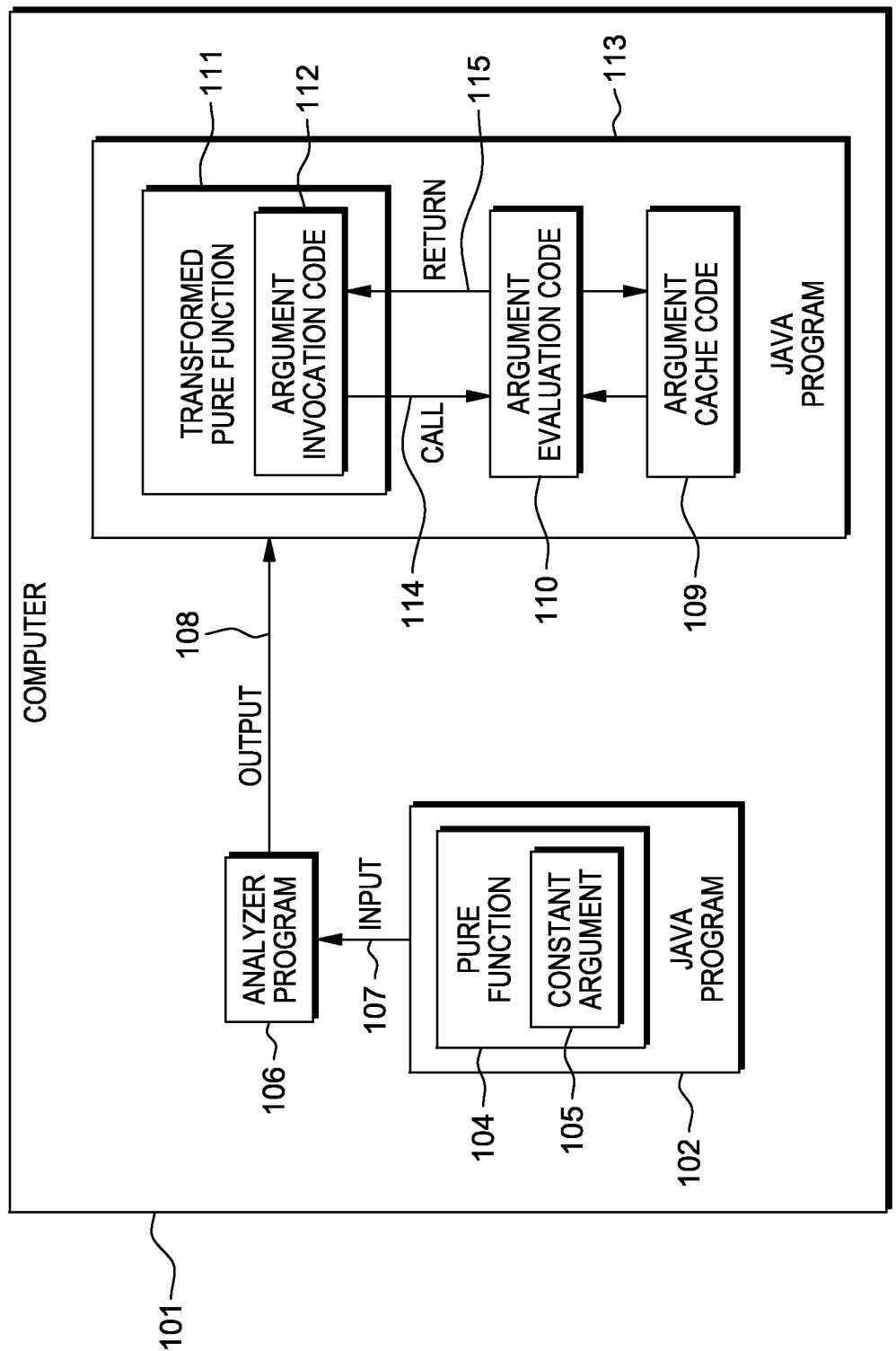
FIG. 1 is a functional block diagram illustrating the operation of an analyzer program, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory) a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

In an exemplary embodiment, a constant argument to a pure function in a Java program is calculated and cached so that the constant argument is not repeatedly calculated each time the pure function is executed. A pure function is a function that does not alter a one or more arguments to the function during an execution of the function, does not have side effects (e.g., modifying a global variable), and does not rely on external systems (e.g., I/O). If a pure function is found in a Java program, an argument to the pure function is analyzed to determine if the argument is constant at runtime, i.e., during the Java program's execution. An argument that is constant at runtime, a constant argument, may be complex and involve lengthy computations to evaluate, but the constant argument has a value that does not change between evaluations.

The present invention will now be described in detail with reference to the Figures. FIG. 1 is a functional block diagram illustrating the operation of an analyzer program, in accordance with an embodiment of the present invention.

In various embodiments of the present invention, computer 101 is computing device that can be a standalone device, a server, a laptop computer, a tablet computer, a netbook computer, a personal computer (PC), or a desktop computer. In another embodiment, computer 101 represents a computing system utilizing clustered computers and components to act as a single pool of seamless resources. In general, computer 101 can be any computing device or a combination of devices with access to Java program 102 and Java program 113, and is capable of running analyzer program 106. Computer 101 may include internal and external hardware components, as depicted and described in further detail with respect to FIG. 4.

In an exemplary embodiment, a source code of Java program 102 is received by analyzer program 106 via input 107. Java program 102 is analyzed by analyzer program 106 that is executing on computer 101 and analyzer program 106 identifies pure function 104 in Java program 102. Analyzer program 106 identifies pure function 104 and determines that an argument to pure function 104, constant argument 105 is constant at runtime. Analyzer program 106 alters Java program 102 and generates Java program 113 from Java program 102 as output 108. When analyzer program 106 generates Java program 113, analyzer program 106 alters pure function 104 and inserts an altered pure function 104, transformed pure function 111, in a place of pure function 104 into Java program 113. Analyzer program 106 replaces constant argument 105 in pure function 104 with argument invocation code 112 in transformed pure function 111. Argument invocation code 112 calls argument evaluation code 110 with call 114. Argument evaluation code 110 invokes argument cache code 109, which determines if constant argument 105 has previously been evaluated. If constant argument 105 has been previously evaluated, analyzer program 106 returns the value of constant argument 105 to argument evaluation code 110, which in turn returns the value of constant argument 105, via return 115, to argument invocation code 112 in transformed pure function 111. If the argument is found to be constant at run time, the argument is replaced in the Java program with code that executes an invocation code at runtime, which in turn executes an evaluation code at runtime that evaluates the argument if the argument has not been previously evaluated and remembers a value of the argument. If the pure function is executed again, the invocation code retrieves the value of the previously evaluated argument and the previously evaluated argument does not have to be evaluated again.

FIG. 2 and FIG. 3 show a Java code that corresponds to Java program 102 and Java program 113. Pure function 213, transformed pure function 215, argument evaluation code 214, and argument cache code 303 correspond to pure function 104, transformed pure function 111 argument evaluation code 110, and argument cache code 109 respectively.

FIG. 2 shows a Java code of pure function 202 that is determined to be a pure function with two constant arguments, constant argument 206 and constant argument 207, by analyzer program 106. Constant argument 206 evaluates to a Date type variable with a value of 1020 milliseconds since midnight on Jan. 1, 1970 (known as "the epoc") and constant argument 207 evaluates to a Date type variable with a value of 1000 milliseconds since the epoc. A word "new" in constant argument 206 causes a memory region to be allocated for a Date type variable which can involve an execution of many instructions. A creation of a Date type variable to be stored in an allocated memory can also involve an execution of many instructions. When argument 206 is evaluated, code 203 compares the value of argument 206 with Date type variable "var", after which a Date type variable that argument 206 evaluates to and the memory region that holds the Date type variable is discarded. Constant argument 206 evaluates to a Date type variable with a value of 1020 milliseconds since the epoc every time that pure function 202 is called.

An evaluation of constant arguments 206 and 207 make a significant contribution to an execution time of a call to pure function 202 every time that pure function 202 is called. To reduce the execution time of pure function 202, analyzer program 106 transforms pure function 202 into pure function 208 that evaluates an argument to pure function 208 only once, regardless of a number of times that pure function 208 is called. Constant argument 206 is replaced with call 209 to function "getPureFunction$0", in code 210. A code for a body of function $getPureFunction$0 is code 211. When function $getPureFunction$0 in code 210 is called, code 211 is executed and returns a value of "TestPureFunctionPureFunctionHolder0.$pureFunction$0" on line 212. A value of TestPureFunctionPureFunctionHolder0.$pureFunction$0 on line 212 is a value of constant variable $pureFunction$0 302 in class TestPureFunctionPureFunctionHolder0 301 in FIG. 3. $pureFunction$0 is a constant variable in class TestPureFunctionPureFunctionHolder0 that is evaluated only once, regardless of a number of times that pure function 208 is called.

A first time that that $getPureFunction$0 is called by pure function 208, code 211 is executed and when "TestPureFunctionPureFunctionHolder0.$pureFunction$0" on line 212 is evaluated and returned, class TestPureFunctionPureFunctionHolder0 is referenced and initialized for a first time which causes constant variable $pureFunction$0 302 to be initialized to a Date type variable with a value of Date (1020L). Because $pureFunction$0 302 is a variable with a "static final Date" type, $pureFunction$0 302 is initialized once to a value of Date (1020L) and continues to have the value for a duration of an execution of Java program 113. The value of $pureFunction$0 302 may be accessed again but $pureFunction$0 302 is never evaluated again during an execution of Java program 113 which reduces the execution time of Java program 113.

Figure 4:
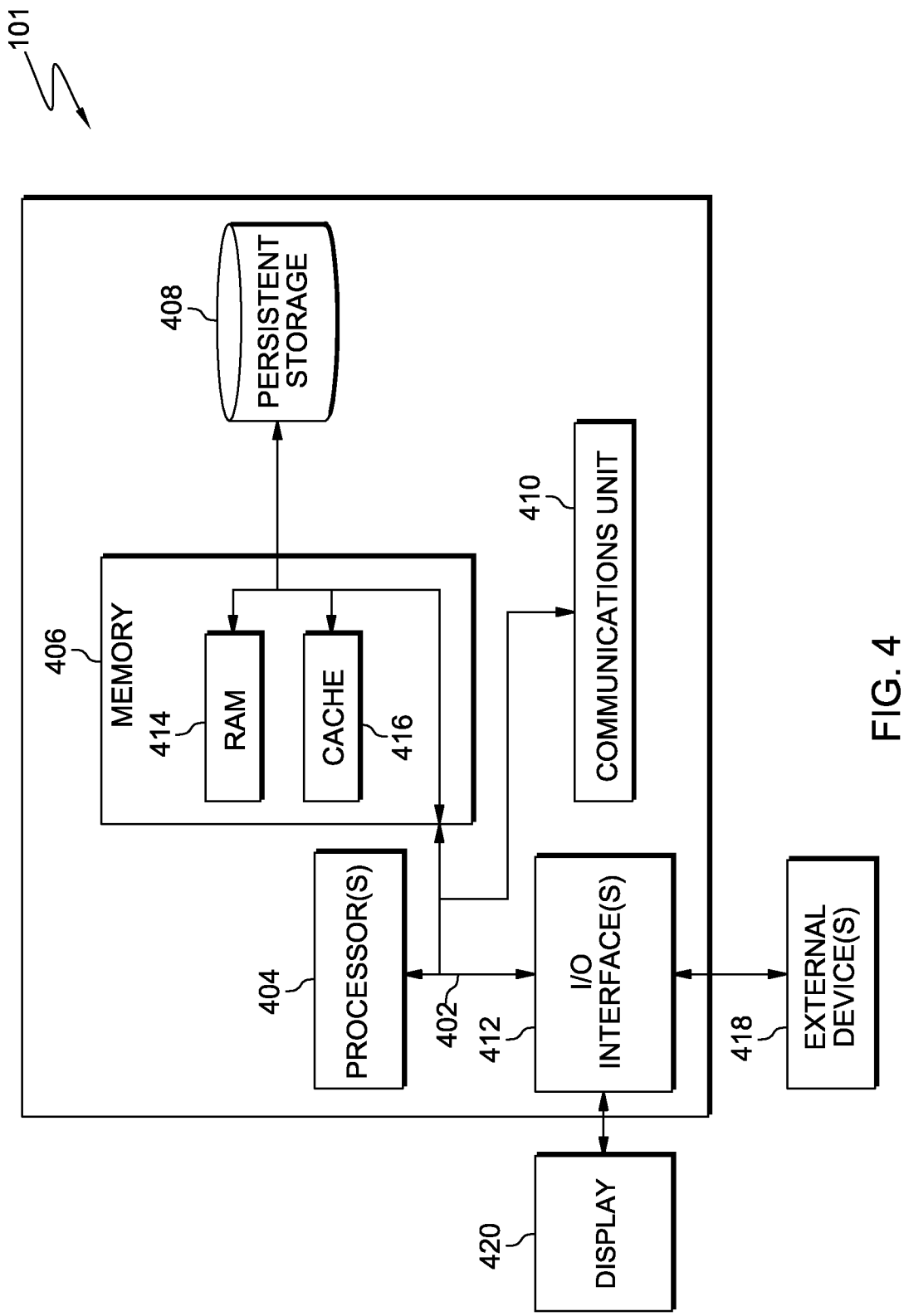
FIG. 4 depicts a block diagram of components of a computing device, in accordance with an embodiment of the present invention.

FIG. 4 depicts a block diagram of components of computer system 101 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made, for example, an execution of a source code in a computer programming language other than Java can be enhanced with a technique described herein.

Computer system 101 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Hot spot monitor 105 and disk health monitor and scrub 106 are stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of computer system 101. In these examples, communications unit 410 includes one or more network interface cards. Communications unit 410 may provide communications through the use of either or both physical and wireless communications links. Java program 102, analyzer program 106, and Java program 113 may be downloaded to persistent storage 408 through communications unit 410.

I/O interface(s) 412 allows for input and output of data with other devices that may be connected to computer system 101. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., Java program 102, analyzer program 106, and Java program 113 can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for replacing an unevaluated input that is constant at runtime with a group of instructions that are configured to determine an output for the unevaluated input, the method composed of:
   identifying, by one or more processors, a group of instructions that use, as input, a plurality of unevaluated inputs that include i) a first unevaluated input that is constant at runtime and ii) a value of a second unevaluated input that varies at runtime, wherein the plurality of unevaluated input is used by the group of instructions to determine an output of the group of instructions, wherein the group of instructions comprise a function and the first unevaluated input and second unevaluated input are arguments to the function;
   identifying, by the one or more processors, the first unevaluated input;
   generating, by the one or more processors, an evaluation code that evaluates the first unevaluated input; and
   replacing, by the one or more processors, the first unevaluated input with an invocation code that invokes the evaluation code.

2. The method of claim 1 wherein:
   the function is in a Java program.

3. The method of claim 1 wherein:
   the function is in a source code in a procedural programming language.

4. The method of claim 2, wherein:
   the evaluation code is expressed in a Java method and the invocation code invokes the Java method to execute the evaluation code.

5. A computer system for replacing an unevaluated input that is constant at runtime with a group of instructions that are configured to determine an output for the unevaluated input, the computer system comprising:
   one or more processors,
   one or more computer-readable memories,
   one or more computer-readable storage devices, and
   program instructions stored on at least one of the one or more storage devices for execution by at least one of the one or more processors via at least one of the one or more memories, the program instructions comprising:
   program instructions to identify a group of instructions that use, as input, a plurality of unevaluated inputs that include i) a first unevaluated input that is constant at runtime and ii) a value of a second unevaluated input that varies at runtime, wherein the plurality of unevaluated input is used by the group of instructions to determine an output of the group of instructions, wherein the group of instructions comprise a function and the first unevaluated input and second unevaluated input are arguments to the function;
   program instructions to identify the first unevaluated input;
   program instructions to generate an evaluation code that evaluates the first unevaluated input; and
   program instructions to replace the first unevaluated input with an invocation code that invokes the evaluation code.

6. The computer system of claim 5, wherein:
   the function is in a Java program.

7. The computer system of claim 5, wherein:
   the function is in a source code in a procedural programming language.

8. The computer system of claim 6, wherein:
   the evaluation code is expressed in a Java method and the invocation code invokes the Java method to execute the evaluation code.

9. A computer program product to replace an unevaluated input that is constant at runtime with a group of instructions that are configured to determine an output for the unevaluated input, the computer program product comprising:
   one or more non-transitory computer-readable storage media and program instructions stored on the one or more non-transitory computer-readable storage media, the program instructions comprising:
   program instructions to identify a group of instructions that use, as input, a plurality of unevaluated inputs that include i) a first unevaluated input that is constant at runtime and ii) a value of a second unevaluated input that varies at runtime, wherein the plurality of unevaluated input is used by the group of instructions to determine an output of the group of instructions, wherein the group of instructions comprise a function and the first unevaluated input and second unevaluated input are arguments to the function;
   program instructions to identify the first unevaluated input;
   program instructions to generate an evaluation code that evaluates the first unevaluated input; and
   program instructions to replace the unevaluated input with an invocation code that invokes the evaluation code.

10. The computer program product of claim 9, wherein:
    the function is in a Java program.

11. The computer program product of claim 9, wherein:
    the function is in a source code in a procedural programming language.

12. The computer program product of claim 10, wherein:
    the evaluation code is expressed in a Java method and the invocation code invokes the Java method to execute the evaluation code.

* * * * *